United States Patent
Weng et al.

(10) Patent No.: US 11,025,120 B2
(45) Date of Patent: Jun. 1, 2021

(54) SINGLE-PHASE BRUSHLESS HIGH-SPEED MOTOR

(71) Applicant: Once Top Motor Manufacture CO., Ltd., Shenzhen (CN)

(72) Inventors: Meng Kun Weng, Guangdong (CN); Bei ni Zhang, Guangdong (CN); Zong Qian Qi, Guangdong (CN)

(73) Assignee: ONCE TOP MOTOR MANUFACTURING CO., LTD., Shenzhen (CN)

( * ) Notice: Subject to any disclaimer, the term of this patent is extended or adjusted under 35 U.S.C. 154(b) by 70 days.

(21) Appl. No.: 16/679,316

(22) Filed: Nov. 11, 2019

(65) Prior Publication Data

US 2021/0091620 A1    Mar. 25, 2021

(30) Foreign Application Priority Data

Sep. 20, 2019 (CN) .......................... 201910894413.1

(51) Int. Cl.
| | |
|---|---|
| H02K 3/42 | (2006.01) |
| H02K 3/52 | (2006.01) |
| H02K 7/08 | (2006.01) |
| H02K 21/20 | (2006.01) |
| H02K 9/06 | (2006.01) |

(52) U.S. Cl.
CPC .............. *H02K 3/42* (2013.01); *H02K 3/524* (2013.01); *H02K 7/088* (2013.01); *H02K 9/06* (2013.01); *H02K 21/20* (2013.01); *H02K 2201/03* (2013.01); *H02K 2203/03* (2013.01); *H02K 2203/12* (2013.01)

(58) Field of Classification Search
CPC .......... H02K 3/42; H02K 3/524; H02K 7/088; H02K 9/06; H02K 21/20; H02K 2201/03; H02K 2203/03; H02K 2203/12
See application file for complete search history.

(56) References Cited

U.S. PATENT DOCUMENTS

| | | | |
|---|---|---|---|
| 7,109,621 B2* | 9/2006 | Lesak | H02K 5/1672 |
| | | | 310/216.023 |
| 7,259,487 B2* | 8/2007 | Mullin | H02K 3/524 |
| | | | 310/216.023 |
| 2005/0122073 A1* | 6/2005 | Mullin | H02K 5/161 |
| | | | 318/400.04 |
| 2011/0043067 A1* | 2/2011 | Li | H02K 23/40 |
| | | | 310/158 |

(Continued)

*Primary Examiner* — Naishadh N Desai

(57) ABSTRACT

A single phase brushless high-speed motor, comprising: an outer housing, a stator assembly, and a rotor assembly; the stator assembly including a coil bobbin, stator coils and a stator core; the stator core including two core blocks, which comprise tooth portions, two opposite ends of the tooth portions being provided with a first magnetic yoke and a second magnetic yoke; the tooth portions of the stator core being engaged with each other to form an inner hole of the stator; the rotor assembly comprising an integral bearing, one end of the integral bearing being connected to an impeller, and the other end being mounted around magnets, which form magnetic body having two poles. The volume of the single-phase brushless motor is decreased and the requirements for the miniaturization of single-phase brushless motors are satisfied by arranging a mounting structure comprising a stator assembly and a rotor assembly.

10 Claims, 8 Drawing Sheets

(56) References Cited

U.S. PATENT DOCUMENTS

| | | | |
|---|---|---|---|
| 2013/0249330 A1* | 9/2013 | King | H02K 21/14 |
| | | | 310/43 |
| 2017/0194848 A1* | 7/2017 | Meginniss, III | A61C 17/34 |
| 2017/0279342 A1* | 9/2017 | Li | F04D 25/06 |

* cited by examiner

SINGLE-PHASE BRUSHLESS HIGH-SPEED MOTOR

TECHNICAL FIELD

The present invention relates to the technical field of brushless motors, and in particular to a single-phase brushless high-speed motor.

BACKGROUND OF THE INVENTION

Motors, which are devices that convert electric energy into mechanical energy under the principle of electromagnetic induction, have been widely used in various electric appliances that are essential for industrial production and daily life. The existing brushless motors can be classified into single-phase brushless motors and three-phase brushless motors. The single-phase brushless motors are suited to be utilized in the field of high-speed motors, especially in the field of motors with a speed of 100,000 rpm or higher. Since such motors have the advantages of high efficiency, small size, low cost and the like, they are particularly suitable for use in household appliances and personal care industries.

In the prior art, a single-phase permanent-magnet brushless motor comprises stator coils wound around the stator teeth, so that the effective space of the windings is reduced. As a result, the motor would have a larger volume and thus cannot meet the requirements for miniaturization of the single-phase brushless motor. Therefore, there remains a need to devise a single-phase brushless motor with decreased volume to meet the requirements for miniaturization of single-phase brushless motor.

Therefore, how to decrease the volume of a single-phase brushless motor has become a technical problem desired to be solved urgently.

SUMMARY OF THE INVENTION

The present invention is aimed at solving the technical problem of decreasing the volume of a single-phase brushless motor.

To this end, according to the first aspect, an embodiment of the present invention discloses a single-phase brushless high-speed motor, comprising:

An outer housing having a cylindrical structure with two open ends and a hollow interior;

A stator assembly disposed within the outer housing and in detachable connection therewith; the stator assembly including a coil bobbin, in the central part of which a through hole is defined for connection; stator coils wound around the outer surface of the coil bobbin where a coil-receiving recess is provided for receiving the stator coils; and a stator core disposed in the outer surface of the coil bobbin for magnetic conduction, the stator core being made from silicon-steel sheets having a thickness of 0.2 mm or less for reducing eddy-current loss of the motor and including two W-shaped core blocks, which are symmetrically disposed at two opposite ends of the coil bobbin and comprise tooth portions, two opposite ends of the tooth portions being provided with a first magnetic yoke and a second magnetic yoke that can be respectively inserted into the through hole; the tooth portions of the stator core being engaged with each other to form an inner hole of the stator; the first magnetic yoke and second magnetic yoke of the stator core being inserted into the through hole of the coil bobbin respectively from both sides; and the core blocks forming a ring-shaped structure as the stator assembly through the first magnetic yoke and the second magnetic yoke; and A rotor assembly disposed within the inner hole of the stator and comprising an integral bearing, one end of the integral bearing being connected to an impeller, and the other end being mounted around magnets, which form magnetic body having two poles;

wherein a Printed Circuit Board (PCB) assembly is mounted on the coil bobbin.

Optionally, a locating column is fixedly disposed in the outer housing, and a locating hole that can be inserted into and matched with the locating column is arranged on the tooth portion.

Optionally, the locating hole is in a rectangular shape or a combined shape of rectangular and circular arc.

Optionally, a ventilation slot for internal ventilation of the brushless motor is arranged on the tooth portion.

Optionally, the PCB assembly comprises PCB and a connector in electrical connection with the PCB.

Optionally, a ventilation hole for ventilation is arranged in the central part of the PCB.

Optionally, two outer surfaces parallel to each other are arranged on the outer wall of the outer housing.

Optionally, cross-sectional dimensions of the first magnetic yoke and the second magnetic yoke are smaller than a cross-sectional dimension of the through hole, and a cross section of the through hole is disposed in a rectangular shape.

Optionally, the inner wall of the outer housing has a tapered structure, and the taper thereof gradually enlarges along one end of the outer housing adjacent to the impeller toward one end of the outer housing away from the impeller.

Optionally, an uneven air gap is formed between the stator assembly and the rotor assembly.

The present invention has the following advantageous effects:

It is possible to optimize the electromagnetic circuit, reduce iron loss and copper loss, and further improve the efficiency of the motor by arranging a mounting structure comprising a stator assembly and a rotor assembly, in which a complete stator assembly is formed by winding the stator coils around the coil-receiving recess of the coil bobbin, inserting the first magnetic yoke and the second magnetic yoke of the two core blocks respectively into the through hole of the coil bobbin and defining an inner hole of the stator through the tooth portions of the two core blocks, with magnets being magnetic body having two poles and stator core having lower eddy-current loss, and in which the rotor assembly is disposed within the inner hole of the stator; under the same power, the higher the efficiency of the motor, the smaller the volume of the motor will be, and thus the volume of the single-phase brushless motor is decreased and the requirements for the miniaturization of single-phase brushless motors are satisfied.

BRIEF DESCRIPTION OF THE DRAWINGS

In order to more clearly illustrate the specific embodiments of the present invention or the technical solutions known in the prior art, the drawings to be used in the specific embodiments or the description of the prior art will be briefly introduced below. Apparently, the drawings as illustrated below merely represent some embodiments of the present invention; and those skilled in the art could obtain other drawings based on those drawings without exercising inventive efforts.

DETAILED DESCRIPTION OF THE SPECIFIC EMBODIMENTS

Figure 1:
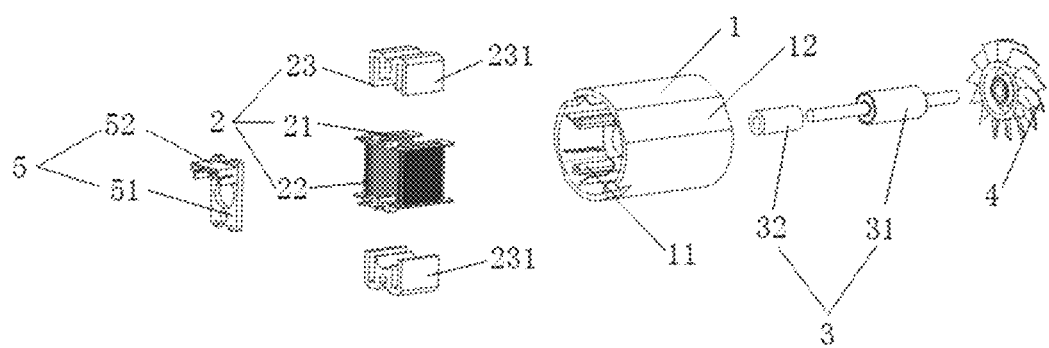
FIG. 1 is a schematic exploded view of the single-phase brushless high-speed motor disclosed in an embodiment.
Figure 2:
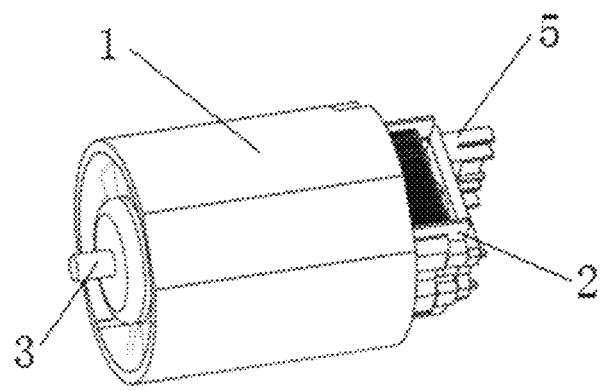
FIG. 2 is a schematic three-dimensional view of the single-phase brushless high-speed motor disclosed in an embodiment.

In order to make the objective, technical solution and advantages of the present invention much clearer, the present invention will be further described in detail below with reference to the accompanying drawings and embodiments. It should be understood that the specific exemplary embodiments described herein are merely used to interpret and explain the present invention, but are not intended to limit the present invention.

In the description of the present invention, it should be noted that the terms such as "center", "upper", "lower", "left", "right", "vertical", "horizontal", "inner", and "outer", denote orientations or position relationships based on those shown in the drawings. They are merely used for illustrating the invention in a simplified manner, instead of indicating or implying that the device or component referred to has or is configured and operated in a specific orientation, and therefore are not to be construed as limiting the invention. Moreover, the terms "first" "second" and "third" are used for illustrative purpose only and are not to be construed as indicating or implying relative importance.

In the description of the present invention, it should be noted that the terms "mounted", "attached", and "connected" are to be understood in broad sense unless explicitly specified or defined otherwise; for example, the components may be connected fixedly, detachably or integrally; they may be connected mechanically or electrically; they may be attached directly or indirectly through an intermediate medium, or with two components being interconnected; or they may be connected wirelessly or via wires. The specific meaning of the above terms in the present invention can be understood according to individual situations by those skilled in the art.

Furthermore, the technical features involved in the different embodiments of the present invention described below may be combined with each other as long as they are not in conflict.

An embodiment of the present invention discloses a single-phase brushless high-speed motor, as shown in FIGS. 1-5, comprising: an outer housing 1, a stator assembly 2, and a rotor assembly 3; the outer housing 1 has a cylindrical structure with two open ends and a hollow interior; the stator assembly 2 is disposed within the outer housing 1 and in detachable connection therewith; the stator assembly 2 includes a coil bobbin 21, in the central part of which a through hole 211 is defined for connection, stator coils 22 wound around the outer surface of the coil bobbin 21 where a coil-receiving recess is provided for receiving the stator coils 22, and a stator core 23 disposed in the outer surface of the coil bobbin 21; the stator core 23 is made from silicon-steel sheets for magnetic conduction and capable of reducing eddy-current loss of the motor and comprises two W-shaped core blocks 231, which are symmetrically disposed at two opposite ends of the coil bobbin 21 and comprise tooth portions 2311, two opposite ends of the tooth portions being provided with a first magnetic yoke 2312 and a second magnetic yoke 2313 that can be respectively inserted into the through hole 211; the tooth portions 2311 of the stator core 23 are engaged with each other to form an inner hole of the stator 232; the first magnetic yoke 2312 and second magnetic yoke 2313 of the stator core 23 are inserted into the through hole 211 of the coil bobbin 21 respectively from both sides, thus forming the stator assembly 2; the rotor assembly 3 is disposed within the inner hole of the stator 232 and comprises an integral bearing 31, one end of the integral bearing 31 being connected to an impeller 4, and the other end being mounted around magnets 32, which form magnetic body having two poles; wherein a Printed Circuit Board (PCB) assembly 5 is mounted on the coil bobbin 21.

In this embodiment, the cross section of the inner hole of the stator 232 is composed of two opposing spline curves. The inner surface of the tooth portions 2311 has a cross section being a spline curves connected by a plurality of points whose radii are gradually increased, and such a spline curves ensures that the air gap between the stator assembly 2 and the rotor assembly 3 gradually becomes larger.

In the present embodiment, the stator core 23 is designed and optimized by finite element simulation. Therefore, the magnetic circuit can be optimized, and the iron loss and the copper loss can be reduced, so that the efficiency of the motor can be further improved. At the same power, the higher the efficiency of the motor, the smaller the volume of the motor will be.

In a specific implementation process, the magnets 32 have two poles, i.e., one pair of poles. When operated under constant frequency, the motor will rotate at a higher speed and the iron loss will be lower and improve the working efficiency of the motor, thereby decreasing the volume of the motor.

It should be noted that the stator coils 22 are wound around the coil-receiving recess of the coil bobbin 21; the first magnetic yoke 2312 and second magnetic yoke 2313 of the two core blocks 231 are respectively inserted into the through hole 211 of the coil bobbin; the tooth portions 2311 of the two core blocks 231 define an inner hole of the stator 232, thus forming a complete stator assembly 2; the rotor assembly 3 is mounted within the inner hole of the stator 232; the core blocks 231 define a ring-shaped structure through the first magnetic yoke 2312 and second magnetic yoke 2313; the stator coils 22 are actually disposed on the yoke portion of the stator core 23. The volume of the single-phase brushless motor is decreased and the requirements for the miniaturization of single-phase brushless motors are satisfied by arranging a mounting structure comprising a stator assembly 2 and a rotor assembly 3.

Figure 5:
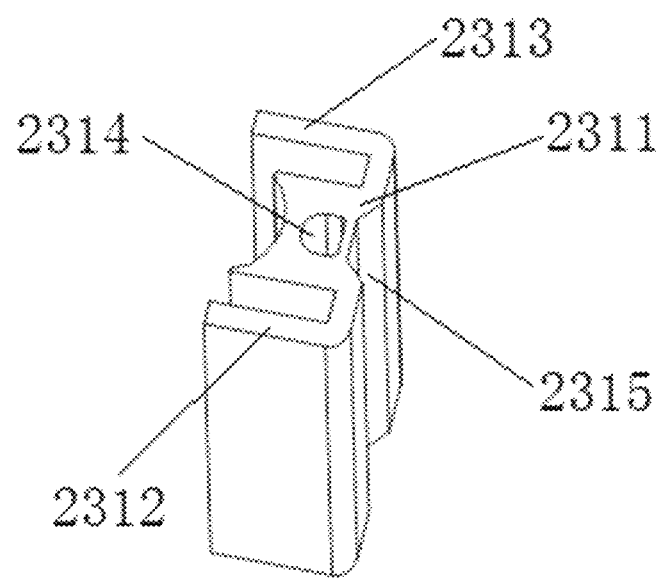
FIG. 5 is a schematic structural view of the core block of the single-phase brushless high-speed motor disclosed in an embodiment.

As shown in FIGS. 1 and 5, a locating column 11 is fixedly disposed in the outer housing 1; and a locating hole 2314 that can be inserted into and matched with the locating column 11 is arranged on the tooth portions 2311.

As shown in FIG. 5, the locating hole 2314 is in a rectangular shape or a combined shape of rectangular and circular arc.

As shown in FIG. 5, a ventilation slot 2315 is arranged on the tooth portions 2311 for internal ventilation of the brushless motor.

As shown in FIG. 1, the PCB assembly 5 includes PCB 51 and a connector 52 electrically connected to the PCB 51. In a specific implementation process, a PIN is arranged on the coil bobbin 21; the PCB 51 is fixed to the PIN by welding; and the connector 52 is fixed to the PCB 51 by welding.

As shown in FIG. 1, a ventilation hole for ventilation is arranged in the central part of the PCB 51.

As shown in FIG. 1, two outer surfaces 12 parallel to each other are arranged on the outer wall of the outer housing 1.

Figure 3:
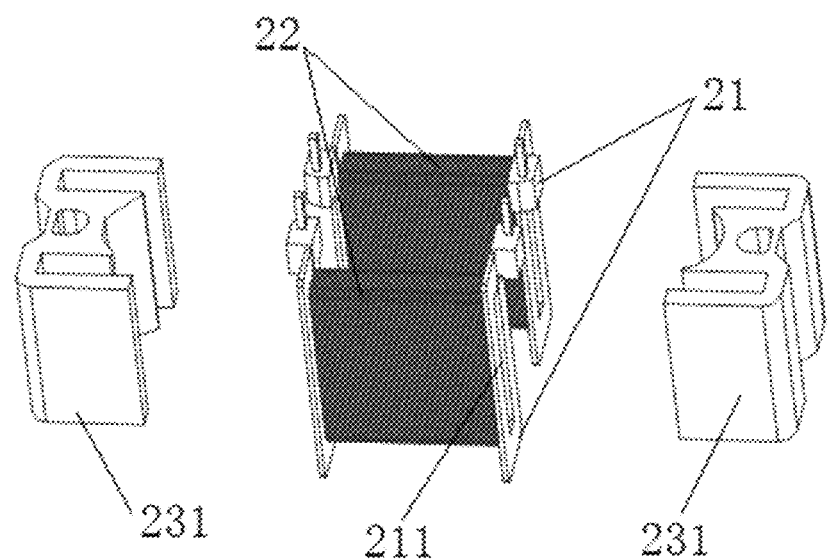
FIG. 3 is a schematic exploded view of the stator assembly of the single-phase brushless high-speed motor disclosed in an embodiment.
Figure 4:
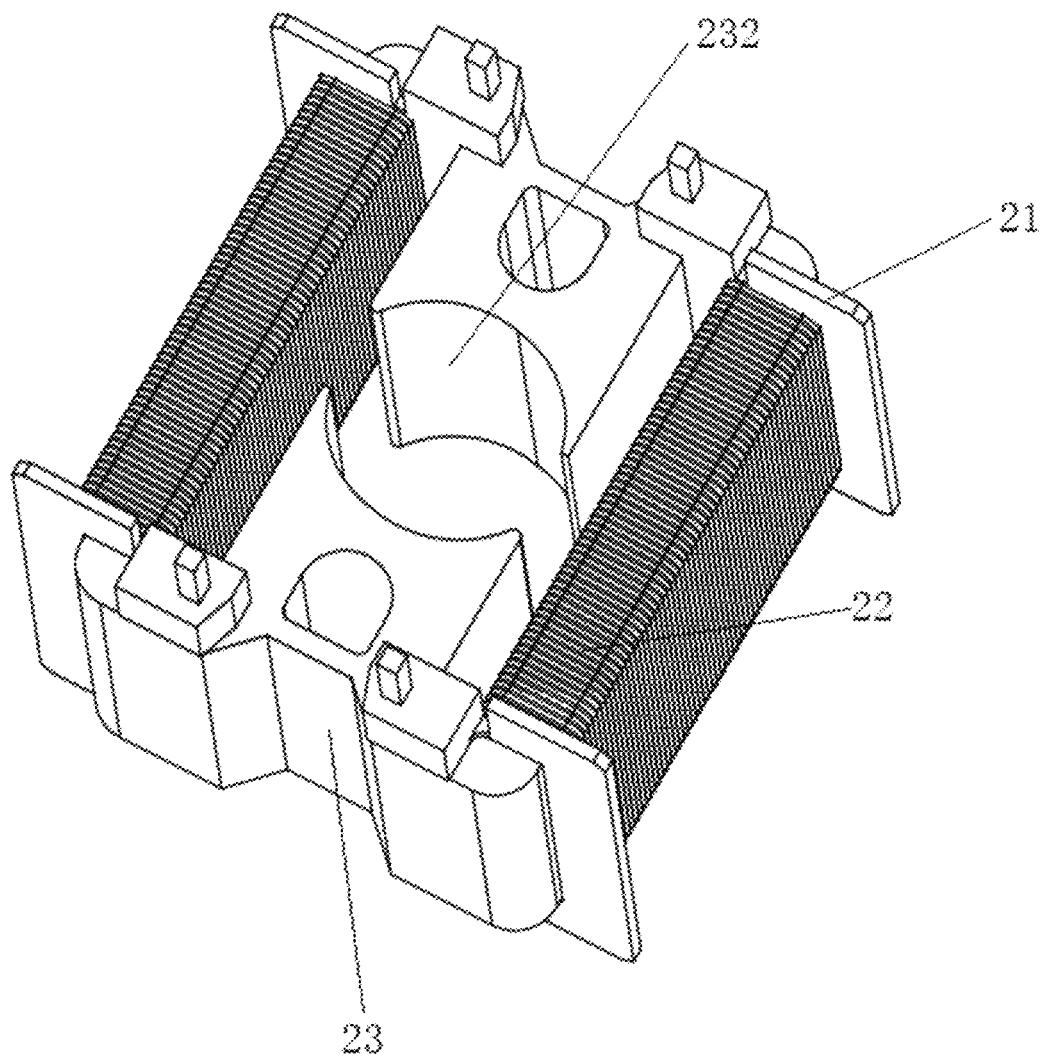
FIG. 4 is a schematic structural view of the stator assembly of the single-phase brushless high-speed motor disclosed in an embodiment.

As shown in FIGS. 3 and 5, the cross-sectional dimensions of the first magnetic yoke 2312 and the second magnetic yoke 2313 are smaller than the cross-sectional dimension of the through hole 211, and the cross section of the through hole 211 is arranged in a rectangular shape. In a specific implementation process, the cross-sectional dimensions of the first magnetic yoke 2312 and the second magnetic yoke 2313 are both smaller than the cross-sectional dimension of the through hole 211 by 0.1-0.5 mm.

Figure 6:
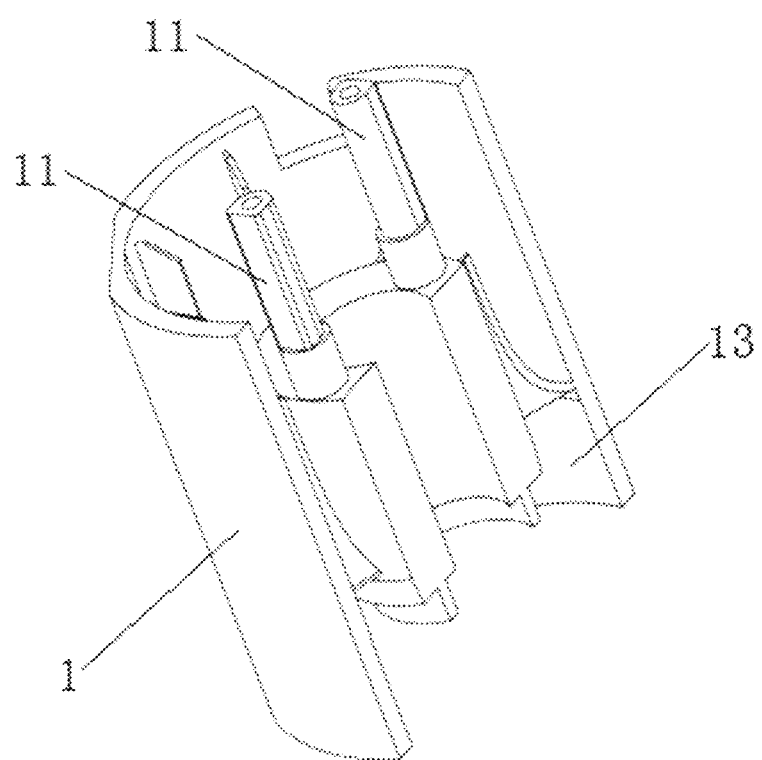
FIG. 6 is a half sectional view showing the outer housing of the single-phase brushless high-speed motor disclosed in an embodiment.

As shown in FIGS. 1 and 6, the inner wall 13 of the outer housing has a tapered structure, and its taper gradually becomes larger along one end of the outer housing 1 adjacent to the impeller 4 toward the other end of the outer housing 1 away from the impeller 4.

Figure 7A:
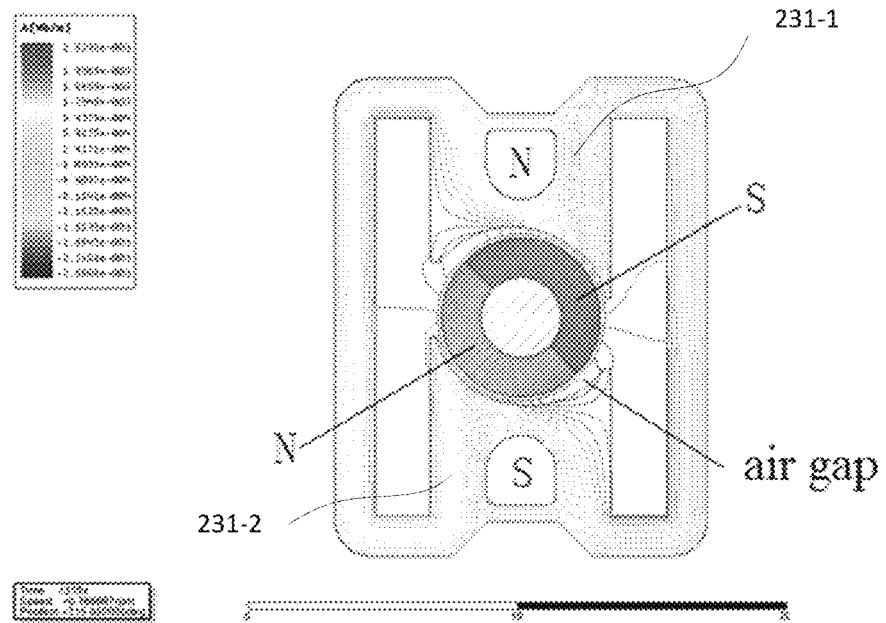
FIG. 7a is a diagram showing initial state of the magnetic pole of the single-phase brushless high-speed motor according to an embodiment.
Figure 7B:
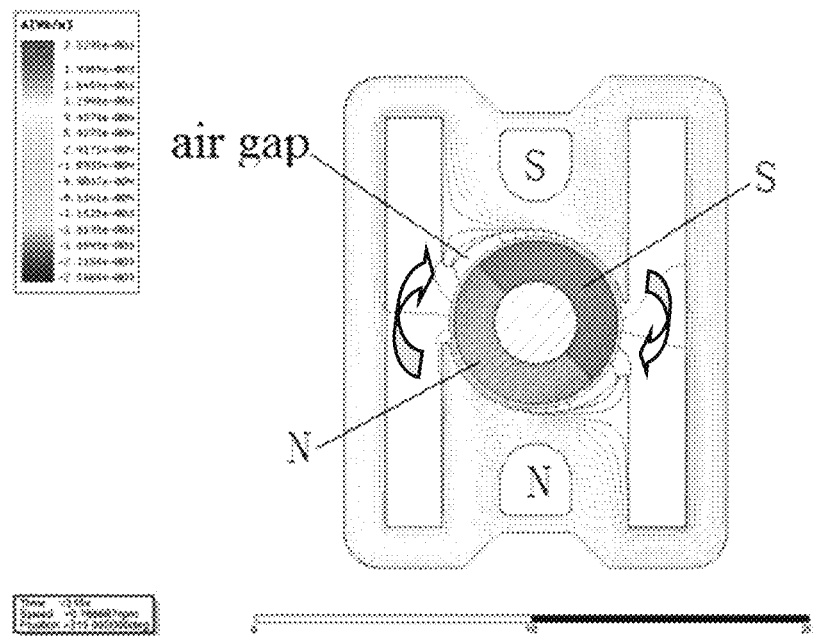
FIG. 7b is a diagram showing changes in magnetic poles when the electric current of the single-phase brushless high-speed motor disclosed in an embodiment changes direction once.

As shown in FIGS. 7a and 7b, an uneven air gap is defined between the stator assembly 2 and the rotor assembly 3.

In FIG. 7a, since the two core blocks 231 are arranged in opposing pair into the same coil bobbin 21, an uneven air gap between the stator assembly 2 and the rotor assembly 3 is finally formed, and the air gap gradually becomes larger.

When the coil on the stator assembly 2 is energized, the magnetic field generated by the coil magnetizes the two core blocks 231. As shown in FIG. 7a, according to the Right-hand Rule, if the polarity of one core block 231-1 is North (N) pole after magnetization, then the other core block 231-2 has a polarity of South (S) pole; since the magnetic field lines pass along the path direction with the smallest magnetic resistance, the S pole of the rotor magnet is attracted by the N pole of the stator core block 231-1 and the N pole is attracted by the S pole of the stator core block 231-2; and the rotor magnet is finally attracted to the stable position shown in FIG. 7a.

Figure 7C:
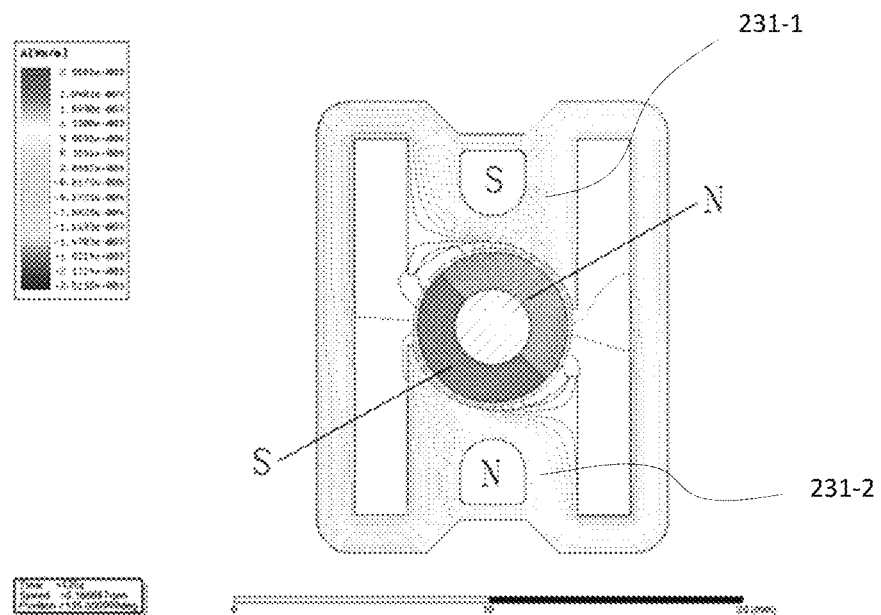
FIG. 7c is a diagram showing stable positions of magnetic poles when the electric current of the single-phase brushless high-speed motor disclosed in an embodiment changes direction once.

When the energized current is reversed, according to the Right-hand Rule, the polarity of one core block 231-1 changes from the N pole to the S pole, and the polarity of the other core block 231-2 changes from the S pole to the N pole. Based on the principle of repulsion of different polarities and attraction of same polarities, the rotor rotates through 180° in the clockwise direction as shown by the arrow in FIG. 7b, and finally stabilizes at the stable position shown in FIG. 7c.

Figure 7D:
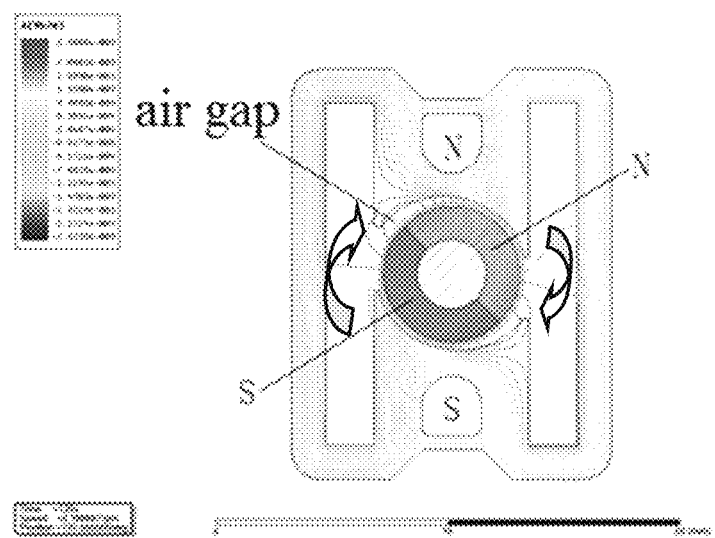
FIG. 7d is a diagram showing changes in magnetic poles when the electric current of the single-phase brushless high-speed motor disclosed in an embodiment changes direction twice.

When the energized current is reversed again, according to the Right-hand Rule, the polarity of one core block 231-1 changes from the S pole to the N pole, and the polarity of the other core block 231-2 changes from the N pole to the S pole. Based on the principle of repulsion of different polarities and attraction of same polarities, the rotor rotates through 180° in the clockwise direction as shown by the arrow in FIG. 7d, and finally stabilizes at the stable position shown in FIG. 7e.

Figure 7E:
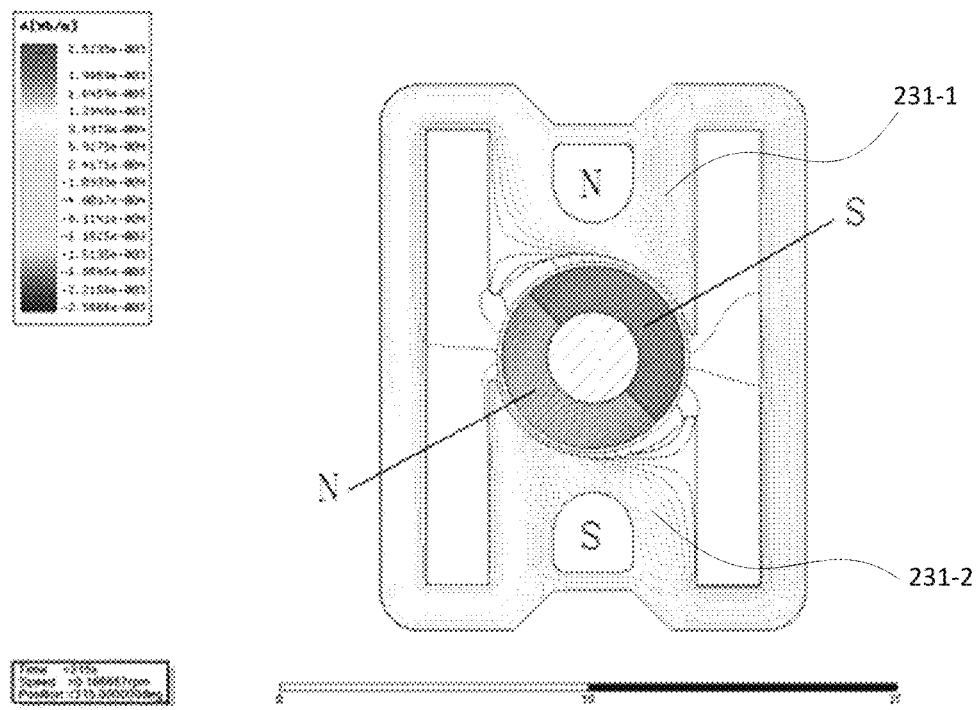
FIG. 7e is a diagram showing stable positions of magnetic poles when the electric current of the single-phase brushless high-speed motor disclosed in an embodiment changes direction twice.

As shown in FIG. 7e, the current through two commutations and the rotor just turned 360 degrees back to the initial position.

When the controller energizes the motor forward and reverse at a certain frequency, the rotor will continuously rotate at certain speed. The higher the frequency, the faster the rotation speed will be.

Working Mechanism:

The stator coils 22 are wound around the coil-receiving recess of the coil bobbin 21; the first magnetic yoke 2312 and the second magnetic yoke 2313 of the two core blocks 231 are respectively inserted into the through hole 211 of the coil bobbin; the tooth portions 2311 of the two core blocks 231 define an inner hole of the stator 232, thus forming a complete stator assembly 2; the rotor assembly 3 is mounted within the inner hole of the stator 232; the core blocks 231 define a ring-shaped structure through the first magnetic yoke 2312 and second magnetic yoke 2313; the stator coils 22 are actually disposed on the yoke portion of the stator core 23. The volume of the single-phase brushless motor is decreased and the requirements for the miniaturization of single-phase brushless motors are satisfied by arranging a mounting structure comprising a stator assembly 2 and a rotor assembly 3.

It is apparent that the embodiments described above are merely exemplary and illustrative for clearly showing the invention, rather than limiting. Other variations or modifications may be made by those skilled in the art in light of the above description. It is unnecessary and impossible to exhaust all of the embodiments. Obvious changes or variations derived therefrom are still within the scope of the invention.

REFERENCE SIGNS

1. Outer housing;
11. Locating column;
12. Outer surface;
13. Inner wall of the outer housing;
2. Stator assembly;
21. Coil bobbin;
211. Through hole;
22. Stator coils;
23. Stator core;
231. Core blocks;
2311. Tooth portions;
2312. First magnetic yoke;
2313. Second magnetic yoke;
2314. Locating hole;
2315. Ventilation slot;
232. Inner hole of stator;
3. Rotor assembly;
31. Integral bearing;
32. Magnets;
4. Impeller;

5. Printed Circuit Board (PCB) assembly;
51. PCB;
52. Connector.

The invention claimed is:

1. A single-phase brushless high-speed motor, characterized in that the motor comprises:
    an outer housing (1) having a cylindrical structure with two open ends and a hollow interior;
    a stator assembly (2) disposed within the outer housing (1) and in detachable connection therewith; the stator assembly (2) including a coil bobbin (21), in the central part of which a through hole (211) is defined for connection, stator coils (22) wound around the outer surface of the coil bobbin (21) where a coil-receiving recess is provided for receiving the stator coils (22), and a stator core (23) disposed in the outer surface of the coil bobbin (21); the stator core (23) being made from laminated silicon-steel sheets having a thickness of 0.2 mm or less for reducing eddy-current loss of the motor, being used for magnetic conduction and constituting the magnetic circuit of the motor, and including two W-shaped core blocks (231), which are symmetrically disposed at two opposite ends of the coil bobbin (21) and comprise tooth portions (2311), two opposite ends of the tooth portions being provided with a first magnetic yoke (2312) and a second magnetic yoke (2313) that can be respectively inserted into the through hole (211); the tooth portions (2311) of the stator core (23) being engaged with each other to form an inner hole of the stator (232); the first magnetic yoke (2312) and second magnetic yoke (2313) of the stator core (23) being inserted into the through hole (211) of the coil bobbin (21) respectively from both sides; and the core blocks forming a ring-shaped structure as the stator assembly (2) through the first magnetic yoke (2312) and the second magnetic yoke (2313); and
    a rotor assembly (3) disposed within the inner hole of the stator (232) and comprising an integral bearing (31), one end of the integral bearing (31) being connected to an impeller (4), and the other end being mounted around magnets (32), which form magnetic body having two poles;
    wherein a Printed Circuit Board (PCB) assembly (5) is mounted on the coil bobbin (21).

2. The single-phase brushless high-speed motor according to claim 1, characterized in that a locating column (11) is fixedly disposed in the outer housing (1), and a locating hole (2314) that can be inserted into and matched with the locating column (11) is arranged on the tooth portion (2311).

3. The single-phase brushless high-speed motor according to claim 2, characterized in that the locating hole (2314) is in a rectangular shape or a combined shape of rectangular and circular arc.

4. The single-phase brushless high-speed motor according to claim 1, characterized in that a ventilation slot (2315) for internal ventilation of the brushless motor is arranged on the tooth portions (2311).

5. The single-phase brushless high-speed motor according to claim 1, characterized in that the PCB assembly (5) includes PCB (51) and a connector (52) electrically connected to the PCB (51).

6. The single-phase brushless high-speed motor according to claim 5, characterized in that a ventilation hole for ventilation is arranged in the central part of the PCB (51).

7. The single-phase brushless high-speed motor according to claim 1, characterized in that two outer surfaces (12) parallel to each other are arranged on the outer wall of the outer housing (1).

8. The single-phase brushless high-speed motor according to claim 1, characterized in that the cross-sectional dimensions of the first magnetic yoke (2312) and the second magnetic yoke (2313) are smaller than the cross-sectional dimension of the through hole (211); and the cross section of the through hole (211) is arranged in a rectangular shape.

9. The single-phase brushless high-speed motor according to claim 1, characterized in that the inner wall of the outer housing (1) has a tapered structure, and the taper thereof gradually enlarges along one end of the outer housing (1) adjacent to the impeller (4) toward one end of the outer housing (1) away from the impeller (4).

10. The single-phase brushless high-speed motor according to claim 1, characterized in that an uneven air gap is defined between the stator assembly (2) and the rotor assembly (3).

* * * * *